United States Patent Office 3,514,112
Patented May 26, 1970

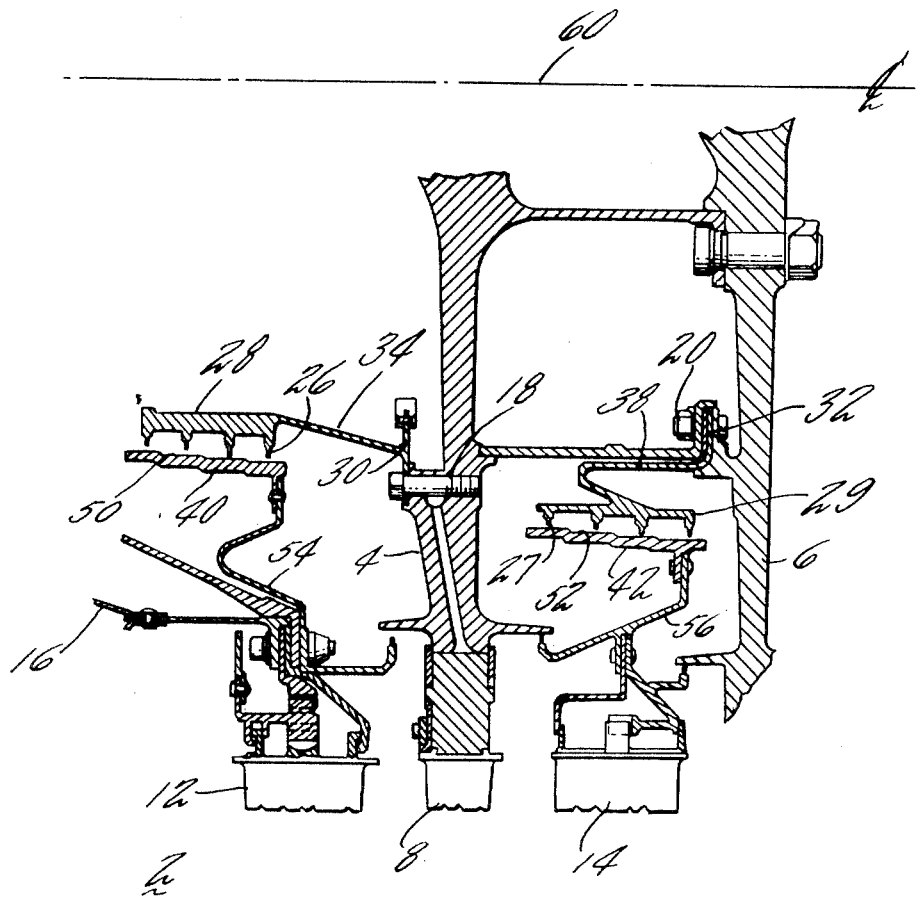

3,514,112
REDUCED CLEARANCE SEAL CONSTRUCTION
Jason S. Pettengill, Jr., South Windsor, Conn., assignor to United Aircraft Corporation, East Hartford, Conn., a corporation of Delaware
Filed June 5, 1968, Ser. No. 734,705
Int. Cl. F02f *11/00;* F01d *1/04;* F04d *29/08*
U.S. Cl. 277—1                              10 Claims

ABSTRACT OF THE DISCLOSURE

A sealing construction primarily adapted for use in a gas turbine engine wherein the clearance between the rotating and static members is maintained relatively tight. The rotating and static members are insensitive to environmental temperature changes, the rotational growth of the rotating member being substantially the sole factor affecting any increase or decrease in the clearance between the rotating and static members.

BACKGROUND OF THE INVENTION

This invention relates to a sealing construction and the process for maintaining relatively tight clearances between the cooperating components of the seal construction, and has particular utility at the delivery end of an axial flow compressor and inlet of a high pressure turbine in a gas turbine engine.

Typically, leakage through labyrinth seals and other type seal constructions produce a significant performance penalty. This is especially true if these seal constructions are incorporated at the rear end of a high compressor, or at the front of the high pressure turbine. The problem encountered by the prior art seal construction is that they normally run at a clearance of between .030 to .060, and as a result of such large clearances, in these particular areas of a gas turbine engine, a significant performance penalty is imposed on the engine.

In these prior art seal constructions these large clearances result from incompatible thermal response of the cooperating members of the seal construction and engine during engine transient operation. Additionally, the problem is magnified by the rotational or centrifugal forces imposed upon the rotating members of the seal construction and engine. The present invention by providing a compatible thermal response rate of the cooperating members of the seal construction and engine during transient operation eliminates or controls substantially the most significant factor which hinders obtaining a tight clearance seal construction. In the construction as described hereinafter, the sole factor which affects the running clearance of the seal construction is the rotational growth imposed on the seal construction.

Summary of the invention

The primary object of this invention is to provide a seal construction which provides a relatively tight clearance over a varied operating speed range and temperature range, particularly in a seal construction adapted for use in a gas turbine engine.

In order to minimize the steady-state operating clearance, and therefore leakage through the seal construction, a process or design approach and construction has been developed which typically produces running clearances from .008 to .015. This design approach and construction consists of structurally isolating the rotating and static seal members from the disc or supporting means to which they are attached. This is generally accomplished by incorporating a displacing means, such as a long cylinder or cone section, between the seal land and labyrinth sealing structure, and the disc or supporting means. The effect of isolating the seal land and labyrinth sealing surface is to minimize the effect of radial deflection of these supporting flanges. By providing a seal construction with the static and rotating sealing members, structurally isolated, the radial displacement of these members is primarily affected by the material temperature changes, i.e., thermal growth, the thermal response rate of these members and the rotational growth of the rotating member and its supporting structure imposed by centrifugal force. It has been determined that the centrifugal growth is relatively small and tends to vary only slightly at the power levels or speed conditions associated with cruise or maximum speed conditions, this meaning that thermal considerations are the major factor in determining and controlling seal clearances.

In employing the design approach of the present invention, thermal growth compatibility is obtained by substantially providing the same thermal response rates of the static member and the rotating member. The thermal growth compatibility is primarily controlled by providing the same or substantially the same thermal coefficient of expansion to the static and rotating members, this being primarily a function of the material of these members; and by providing the geometry of the seal and seal land with substantially the same transient thermal response rate, or more specifically, substantially or identical time constants. Since the material temperatures are therefore provided to be identical at any instant, whether transient or steady-state, and since the thermal coefficients are substantially identical, the thermal growth of both rotating and static members is identical, and the two parts will thereby maintain their relative position independent of any environmental temperature change.

The present invention, since it substantially elimiantes any effect on the seal construction resulting from environmental temperature changes, relies primarily on the rotational growth of the rotating seal member to obtain and provide control of the clearance between the static and rotating member. This is accomplished by positioning the rotating member on the inner side or, internal of, the static member, and therefore, as the speed of the rotating member increases, the rotating member expands or grows outwardly. Minimum seal clearance is therefore obtained at maximum speed of the rotating member, and this can be accurately determined since the rotational growth of the rotating member is relatively small and determinable.

Brief description of the drawing

FIG. 1 is a longitudinal sectional view of the initial stages of a high pressure turbine showing the device of the invention.

Description of the preferred embodiment

Referring now to the present preferred embodiment, the invention is herein illustrated with a portion of a gas turbine engine. In the arrangement as shown, the seal construction hereinafter described, is positioned in the front or first stages of turbine 2. It should be understood and is expressly stated here that the seal construction hereinafter described has application throughout a gas turbine engine, for example, at the rear stages of the high compressor, and therefore the embodiment herein illustrated should not be construed to be the sole application of the present invention.

In the arrangement, as shown, turbine 2 includes rotor discs 4 and 6, and supported in the periphery of discs are rotor blades 8. Directly upstream of each stage of rotor blades is a row of stator vanes 12 and 14 supported by casing 16. This type of construction is generally old and is illustrated in the Savin Pat. No. 2,747,367.

Connected to each rotor disc by bolts 18 and 20 is rotating seal member 28 and 29. Each of the rotating seal members includes a labyrinth sealing surface 26 and 27, this surface being isolated from the point of attachment, 30 and 32 respectively, to rotor discs 4 and 6. More specifically, the rotating surfaces 26 and 27 are isolated therefrom by displacing means 34 and 38 and as herein illustrated, the displacing means may be an axially extending cylindrical or conical shaped member. The significance of displacing means 34 and 38 lies not in the shape but rather in that it minimizes any effects of radial deflection that the disc may impart to the rotating sealing surfaces 26 and 27.

The seal construction of the present invention also includes static seal members 40 and 42. As shown in the present arrangement, the static seal members are connected to casing 16 and supported therefrom. Each of the static seal members includes seal lands 50 and 52, the seal lands being isolated from the point of attachment of the static seal member to the casing 16 by displacement means 54 and 56. These displacement means have the same function and significance as the displacement means employed in connection with the rotating seal members. More specifically, their function is to isolate the seal lands 50 and 52 from the support means on casing 16 and thereby minimize or eliminate the effect of radial deflection at the supporting flanges.

As has been noted hereinbefore, the clearance between the rotating and static seal members in prior art constructions is a function of both the thermal growth of the seal construction and its supporting structures and of the rotational growth of the rotating seal member and the supporting structures. Since there is no effort made to match or control the thermal response rates of these structural elements, the clearance between the rotating and static seal members in these prior art constructions is "over-sized" or made large to obtain a desired clearance at maximum speed or cruise conditions and to accommodate or provide for any adverse conditions which may result during engine or speed transient conditions. This necessarily results in a significant penalty to engine performance. The seal construction of the present invention provides for this thermal incompatibility by providing the discs 4 and 6, the static seal member 40 and 42 and the rotating seal member 28 and 29 with the same or substantially the same thermal coefficient of expansion. This can be most easily done by providing a rotating seal member and a static seal member of the same material. There are other known ways of providing these members with the same thermal coefficients of expansion, the one described herein merely being illustrative.

In addition to providing a seal construction with substantially the same thermal coefficients of expansion, the thermal response rates of the sealing surface of the rotating member and the seal land of the static member are matched. This means that the transient thermal response rates are substantially identical or more specifically the time constants as determined by the $(hA/mc_p)$ values are the same. It has been determined that one method of providing time constants of substantially identical values is by controlling the thickness and configuration of the sealing surface and seal lands of the seal constructions.

Another feature of sealing surfaces 26 and 27 of the rotating members and seal lands 50 and 52 of the static members is their relative position therebetween. It is pointed out that by providing a seal construction wherein the sealing surface and seal lands are isolated from the supporting structure thereby substantially eliminating any radial displacement at their points of attachment, by providing a seal construction wherein the supporting structures for the rotating and static seal members and the rotating and static seal members have substantially the same thermal coefficients of expansion and by providing the latter members with substantially the same thermal response rates, a seal construction is provided wherein the rotating and static seal members will maintain their relative position independent of any environmental temperature change. This means that the most significant factor which affects the clearance between the rotating and static seal members is the rotational growth of the rotating seal member. The present invention takes advantage of this growth by positioning the rotating member internal of the static member or more specifically closer to the engine center line 60 than the static member. Therefore, as the rotational speed of the rotating member increases, the rotating member grows or expands outwardly thereby decreasing the clearance between the rotating and static seal members. This type of construction thereby provides a minimum clearance, approximately .008 inch, at the maximum rotational speed of the rotating member. It has been determined that as the result of this seal construction, seal leakage can be significantly reduced and engine performance significantly improved.

It is understood that the invention is not limited to the specific embodiments herein illustrated and described but may be used in other ways without departure from its spirit as defined by the following claims.

I claim:

1. In a seal construction including a rotating member and a static member, the method of controlling the clearance between the rotating member and the static member comprising the steps of;
   isolating the rotating and static members from their respective points of attachment to a supporting member of the seal so that any displacement at the point of attachment does not produce any significant displacement of the rotating and static members;
   matching the thermal coefficients of expansion of the static and rotating seal members;
   matching the thermal response rates of the static and rotating members by providing them with substantially the same time constants; and
   positioning the rotating member internal of the static member, the rotating member expanding outwardly as the rotational speed of the rotating member is increased, the clearance between the rotating and static member being substantially solely a function of the rotational growth.

2. The method of claim 1 including:
   providing minimum clearance between the rotating and static members at maximum rotational speed of the rotating member.

3. The method of claim 1 including:
   providing a range of operating clearances between the rotating and static members of between .008 inch and .015 inch.

4. A sealing construction comprising:
   a static seal member
   a rotating seal member cooperating with the static member, the rotating and static members having substantially the same thermal coefficients of expansion and thermal response rates, the rotating member being positioned internal of the static member with respect to the central axis of the seal construction,
   means for supporting both the static and rotating members; and
   means for displacing the seal and seal land of the rotating and static members respectively from the point of attachment of the rotating and static members to the support means, the clearance between the rotating and static members being substantially solely a function of the outward rotational growth of the rotating member.

5. The sealing construction as in claim 1 wherein:
   the displacing means comprises a substantially conically shaped extension extending between the point of attachment of the static member to the support means and the seal land of the static member; and a cylindrical shaped extension extending between the point of attachment of the rotating member to the support means and the sealing surface of the rotating member.

6. The seal construction as in claim 1 wherein:
the minimum clearance between the rotating and static seal members is provided at the maximum rotational speed of the rotating member.

7. In a gas turbine engine, a sealing device comprising:
a rotatable disc;
a support means for supporting a static seal member;
a rotating seal member connected to the rotatable disc and rotated thereby, the rotating member cooperating with and being positioned internal of the static member with respect to the engine center line and the average thermal coefficients of expansion and the thermal response rates of the static member and rotating member being substantially the same;
means for displacing the seal land of the static seal member axially from the point of attachment of the static member to the support means; and
means for displacing the sealing surface of the rotating member axially from the point of attachment of the rotating member to the disc, the running clearance between the sealing surface of the rotating member and the seal land of the static member being substantially solely a function of the outward rotational growth of the rotating member.

8. The sealing construction as in claim 7 wherein:
the displacing means comprises a substantially conical shaped extension extending axially between the point of attachment of the static member to the support means and the seal land of the static member; and
a cylindrical shaped extension extending axially between the point of attachment of the rotating member to the disc and the sealing surface of the rotating member.

9. The seal construction as in claim 7 wherein:
the minimum running clearance between the rotating and static seal members is provided at the maximum rotational speed of the disc.

10. The seal construction as in claim 7 wherein:
the clearance between the sealing surface and the seal land is maintained in the range of .008 to .015 in over the entire speed range of the disc.

References Cited
UNITED STATES PATENTS

| | | | |
|---|---|---|---|
| 2,963,307 | 12/1960 | Bobo | 277—53 |
| 3,382,670 | 5/1968 | Venable | 253—39 |
| 3,403,889 | 10/1968 | Ciokajlo | 253—39 |

SAMUEL ROTHBERG, Primary Examiner

U.S. Cl. X.R.

253—39; 277—26, 53